Figures 1, 2, 3:
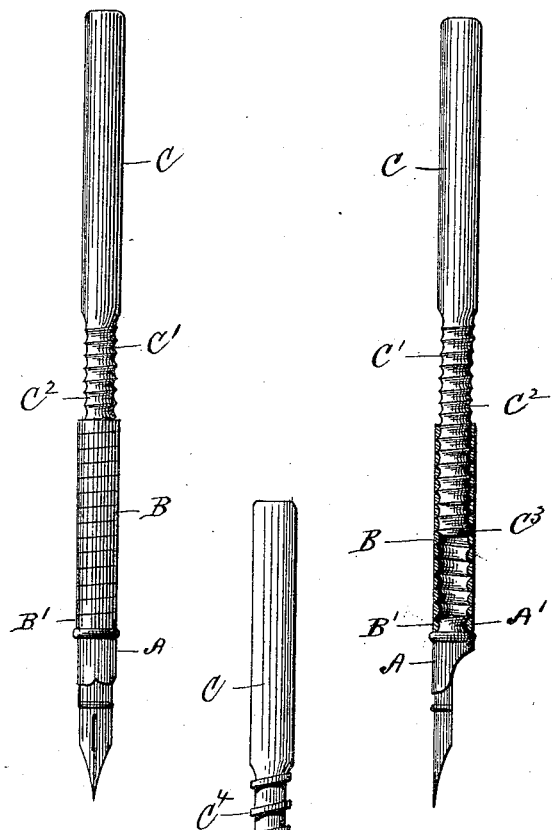

(No Model.)

F. BAUMANN.
PEN HOLDER.

No. 467,077. Patented Jan. 12, 1892.

Witnesses  Inventor
H. W. Fowler  Friedrich Baumann
Rufus B. Fowler

UNITED STATES PATENT OFFICE.

FRIEDERICH BAUMANN, OF WORCESTER, MASSACHUSETTS, ASSIGNOR OF ONE-HALF TO VICTOR OHLANDER, OF SAME PLACE.

PEN-HOLDER.

SPECIFICATION forming part of Letters Patent No. 467,077, dated January 12, 1892.

Application filed March 27, 1891. Serial No. 386,623. (No model.)

*To all whom it may concern:*

Be it known that I, FRIEDERICH BAUMANN, a citizen of Germany, residing at Worcester, in the county of Worcester and State of Massachusetts, have invented a new and useful Improvement in Pen-Holders, of which the following is a specification, reference being had to the accompanying drawings, forming a part of the same, in which—

Figure 1 represents one of my improved pen-holders. Fig. 2 represents one of my improved pen-holders with the coiled spring forming the elastic section of the same shown in central view; and Fig. 3 represents one of my improved pen-holders with the spring shown in central sectional view, as in Fig. 2, but showing a modified form of spring screw-threaded stem.

Similar letters refer to similar parts in the several figures.

My invention has for its object to provide an elastic pen-holder whose elasticity may be varied at will to suit the hand or the elasticity of the pen used and which shall be simple and inexpensive in its construction.

A denotes a metallic tubular section provided with a socket to receive the butt of the pen in the usual manner and having its inner end pressed into shape to form a single screw-thread adapted to receive the end of the coiled spring B. The coiled spring B is made of elastic wire, preferably of steel, which is substantially semicircular in its cross-section. The spring B is coiled closely, so as to form a tube having a continuous cylindrical outer surface, while the convex side of the wire forms an interior screw-thread. The end coil B' of the spring B is screwed upon the end A' of the section A, thereby securely uniting the section A and spring B together.

C denotes the stem of the holder, which may be formed of wood, vulcanite, or other suitable material, and is provided with a screw-threaded section C', having a concave spiral groove $C^2$, fitting the convex side of the wire forming the spring B. That portion of the spring B between the ends $C^3$ of the stem C and the end A' of the section A forms an elastic section in the completed pen-holder, which yields as pressure is applied upon the nib of the pen in the operation of writing by permitting a flexure of the pen-holder between the section A and the stem C.

By making the diameter of the wire in a line parallel with the axis of the spring greater than the diameter of the wire in a line at right angles with the axis of the spring a greater resistance is offered to a longitudinal strain which would open the coils of the spring than to a transverse strain which would produce a flexure of the spring between the section A and the stem C. The elastic resistance of the spring to flexure is readily varied by screwing the stem C into or out of the spring B, so as to vary the distance between the ends A' and $C^3$. The greater the distance the less the resistance offered to the flexure of the holder, and vice versa.

In Fig. 3 I have shown a slight modification in the construction of the pen-holder, which consists in making the spring of the pen-holder of elastic wire, in the form of a thin ribbon $B^2$ rectangular in its cross-section, and winding the spring with the coils open or a slight distance apart and forming the screw-threaded section of the stem so that the screw-thread $C^4$ upon the stem will fit and fill the space between the coils of the spring, forming a continuous outer cylindrical surface so far as the stem is screwed into the spring. This method of constructing the holder is in some respects preferable to that shown in Figs. 1 and 2, for the reason that the spring can be made much lighter than in the form shown in Fig. 2. It will be observed with reference to above methods of construction that the coils of the spring which are engaged by the screw-threaded stem are held by the screw-thread from longitudinal movement, each coil being locked between contiguous screw-threads upon the stem C.

The form of the end A' of the pen-holding section in Fig. 3 is slightly modified in shape to conform to the changed shape of the wire of which the spring is formed. The screw-threaded section $C^2$ is made sufficiently large to completely fill the interior of the spring B, so as to cause the coils of the spring to pinch the stem C and prevent its becoming loosened by use.

I do not claim, broadly, a pen-holder provided with an elastic section, as such has been heretofore known.

What I claim as my invention, and desire to secure by Letters Patent, is—

1. The combination, in a pen-holder, of the pen-holding section A, provided with a screw-threaded end A', adapted to receive a coiled spring, a coiled spring attached to said pen-holding section, and a stem connected with the opposite end of said spring, substantially as described.

2. In a pen-holder, the combination of a pen-holding section, a coiled spring with one end attached to said section, and a stem provided with a screw-threaded section adapted to fit the interior of said spring, whereby the elasticity of said spring is varied by varying the distance between said stem and said pen-holding section, substantially as described.

3. In a pen-holder, the combination of a pen-holding section and rigid stem, a coiled spring uniting said stem and said pen-holding section, said spring being formed of elastic wire whose diameter parallel with the axis of said spring is greater than the diameter at right angles to the axis of said spring, whereby its resistance to longitudinal strain is greater than its resistance to flexure, substantially as described.

4. In a pen-holder, the combination of a pen-holding section, a rigid stem, a coiled spring uniting said stem and said pen-holding section, said spring being formed of elastic wire substantially semicircular in its cross-section, and said stem being provided with a screw-threaded section adapted to engage said coiled spring, substantially as described.

5. The combination, in a pen-holder, of the pen-holding sections A, provided with a screw-threaded end A', a coiled spring B, formed of elastic wire substantially semicircular in its cross-section, and a screw-threaded stem C, fitted to engage said spring, whereby the resistance of said spring to flexure is varied, substantially as described.

Dated this 21st day of March, 1891.

FRIEDERICH BAUMANN.

Witnesses:
 RUFUS B. FOWLER,
 H. W. FOWLER.